2,850,425

FUNGICIDAL COMPOSITION COMPRISING AN AROMATIC HYDRAZINE

Van R. Gaertner, Dayton, Ohio, assignor to Monsanto Chemical Company, St. Louis, Mo., a corporation of Delaware No Drawing. Application September 21, 1954
Serial No. 457,552

8 Claims. (Cl. 167—30)

This invention relates to new and useful improvements in agricultural fungicides. The invention further relates to methods of treating plants which are subject to attack by fungi and is particularly concerned with eradicant compositions for cereal plant rusts, especially wheat rust.

I have found that unusually effective fungicidal compositions are obtained when the active ingredient is a compound selected from the class consisting of hydrazines having the formula

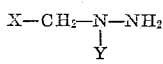

in which X and Y are hydrocarbon radicals containing an aromatic nucleus, are free of non-benzenoid unsaturation, by which is meant acetylenic and olefinic unsaturation, and have from 6 to 12 carbon atoms; and the salts of said hydrazine compounds.

One class of compounds having the above formula and useful for the present purpose are, for example, the 1-phenylalkyl-1-arylhydrazines having from 1 to 6 carbon atoms in the alkyl portion thereof and from 6 to 12 carbon atoms in the aryl radical such as 1-benzyl-1-phenylhydrazine and the hydrochloride, hydrobromide, sulfate, phosphate or acetate thereof; 1-(2-phenylethyl)-1-phenylhydrazine and a hydrohalide or 4-toluenesulfonate thereof; 1-(4-phenylbutyl)-1-phenyldrazine; 1-(6-phenylhexyl)-1-phenylhydrazine; 1-(2-phenylpropyl)-1-(1-naphthyl)hydrazine; 1-benzyl-1-(4-xenyl)-hydrazine, etc.

Another class of compounds which I have found to be very efficient rust eradicants comprises the 1-alkylphenyl-alkyl-1-arylhydrazines and salts thereof such as 1-(4-ethylbenzyl) - 1 - phenylhydrazine hydrochloride, 1 - (2,4 - dimethylbenzyl) - 1 - phenylhydrazine; 1-[2 - (2 - n - butylphenyl)ethyl]-1-phenylhydrazine benzenesulfonate; 1-[3-(4-tolyl)propyl]-1-(1-naphthyl)hydrazine, etc.

A particularly useful class of wheat rust eradicants comprises the 1,1-bis(aralkyl)hydrazines or their salts such as 1,1-dibenzylhydrazine; 1,1-bis(2-phenylethyl)hydrazine; 1-benzyl - 1-(3 - phenylpropyl)hydrazine; 1 - (1-naphthylmethyl)-1-(2-phenylethyl)-hydrazine and the hydrohalides, acetates, sulfonates or phosphates thereof.

Still another class of presently useful hydrazine compounds comprises the 1,1-bis(alkylaralkyl)hydrazines or their salts such as 1,1-bis[2-(4-isopropylphenyl)ethyl]-hydrazine and 1,1-bis(3-n-amylbenzyl-hydrazine and salts thereof.

I have discovered that the hydrazines herein defined are highly efficient for preventing and eradicating fungus growth on plants, generally. They are particularly valuable in the control of cereal rusts, whereby they function as plant chemotherapeutants against the various leaf and stem rusts of wheat, barley, rye, and oats and other small grain crop plants. Such cereal rusts as the stem rust *Puccinia graminis tritici*, or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance. In the prior art, much effort has been expended in breeding rust-resistant strains of these cereals; but as new strains of, e. g., wheat, are developed, new races of the above classes of rusts appear and proceed to attack the new, presumably rust-resistant strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has been subjected to close scrutiny. Unfortunately, most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance. The presently useful hydrazines or hydrohalides thereof may be applied directly to the cereal plants; but because these compounds are effective in extremely dilute concentrations, i. e., in concentrations of from, say, 0.01% to 1.0%, it is preferred to incorporate them with a carrier or diluent.

Fungicidal dusts may be prepared by mixing the compounds with dusting materials such as talc, clay, lime, bentonite, pumice, fuller's earth, etc. The majority of the presently useful hydrazines will be found to be water-insoluble. These may be dissolved in organic solvents therefor and the resulting solutions used as fungicidal or fungi-preventing sprays. More expediently, a small amount of a concentrated solution of the hydrazine compound in an organic solvent, e. g., cyclohexanone, may be added to water in the presence of an emulsifying agent to form an emulsion, and the oil-in-water emulsion thus obtained is employed as a spray. Suspensions or dispersions of the hydrazine compounds in a non-solvent such as water, or aqueous solutions of the water-soluble compounds, are advantageously employed in the treatment of the plant foliage.

The present invention is further illustrated, but not limited, by the following example:

Example 1

The therapeutic effect of 1-benzyl-1-phenylhydrazine hydrochloride was determined as follows:

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

The test chemical (100 mg.), i. e., the 1-benzyl-1-phenylhydrazine hydrochloride, was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with 5 ml. of water to give an emulsion containing 1% by weight of the hydrazine. For the instant test the 1% emulsion was further diluted with water to give a concentration of 0.5% by weight of the test compound.

Spraying of the plants with the emulsion was effected by means of an atomizer, 5 ml. of the emulsion being used per pot of 5 plants. The sprayed plants were then returned to the greenhouse and held there for a week. Observation of the plants at the end of that time disclosed no rust pustules on the inoculated and sprayed plants. Similarly inoculated, but unsprayed plants, which had been maintained in the incubator and greenhouse for the same length of time were found to be badly affected by the rust.

What I claim is:

1. An agricultural fungicide comprising water, an emulsifying agent, and a fungicidal quantity of a compound selected from the class consisting of hydrazines having the formula

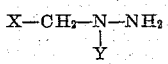

in which X and Y are hydrocarbon radicals containing an aromatic nucleus, are free of acetylenic and olefinic unsaturation and have from 6 to 12 carbon atoms, and salts of said hydrazine compounds.

2. A wheat rust eradicant composition comprising water, an emulsifying agent, and a wheat rust-inhibiting quantity of a compound selected from the class consisting of hydrazines having the formula

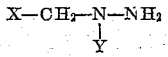

in which X and Y are hydrocarbon radicals containing an aromatic nucleus, are free of acetylenic and olefinic unsaturation and have from 6 to 12 carbon atoms, and salts of said hydrazine compounds.

3. A wheat rust eradicant composition comprising water, an emulsifying agent, and a wheat rust-inhibiting quantity of the hydrochloride of a hydrocarbon 1-aralkyl-1-arylhydrazine having from 7 to 13 carbon atoms in the aralkyl radical and from 6 to 12 carbon atoms in the aryl radical.

4. A wheat rust eradicant composition comprising water, an emulsifying agent and a wheat rust-inhibiting quantity of 1-benzyl-1-phenylhydrazine hydrochloride as the essential effective ingredient.

5. The method of inhibiting the development of fungi on growing plants which comprises applying to said plants a fungicidal composition comprising as the essential effective ingredient a compound selected from the class consisting of hydrazines having the formula

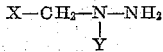

in which X and Y are hydrocarbon radicals containing an aromatic nucleus, are free of acetylenic and olefinic unsaturation and have from 6 to 12 carbon atoms, and salts of said hydrazine compounds.

6. The method of inhibiting the development of rust on wheat which comprises applying to the wheat a rust inhibiting quantity of an eradicant composition comprising as the essential effective ingredient a compound selected from the class consisting of hydrazines having the formula

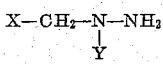

in which X and Y are hydrocarbon radicals containing an aromatic nucleus, are free of acetylenic and olefinic unsaturation and have from 6 to 12 carbon atoms, and salts of said hydrazine compounds.

7. The method of inhibiting the development of rust on wheat which comprises applying to the wheat a rust inhibiting quantity of an eradicant composition comprising as the essential effective ingredient a hydrochloride of a 1-aralkyl-1-arylhydrazine having from 7 to 13 carbon atoms in the aralkyl radical and from 6 to 12 carbon atoms in the aryl radical.

8. The method of inhibiting the development of rust on wheat which comprises applying to the wheat a rust inhibiting quantity of an eradicant composition comprising 1-benzyl-1-phenylhydrazine hydrochloride as the essential effective ingredient.

References Cited in the file of this patent

UNITED STATES PATENTS 2,054,062     Bonrath _____ Sept. 15, 1936

OTHER REFERENCES

Philips: Liebig's Annalen der Chemie, vol. 252, pp. 286–288.

Horsfall: Fungicides and Their Action, pp. 132, and 155–156, vol. II, 1945.